US008660347B2

(12) United States Patent
Tamura

(10) Patent No.: US 8,660,347 B2
(45) Date of Patent: Feb. 25, 2014

(54) IMAGE PROCESSING APPARATUS AND PROCESSING METHOD THEREFOR

(75) Inventor: Hirokazu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 12/936,507

(22) PCT Filed: Sep. 1, 2010

(86) PCT No.: PCT/JP2010/065359
§ 371 (c)(1),
(2), (4) Date: Oct. 5, 2010

(87) PCT Pub. No.: WO2011/037009
PCT Pub. Date: Mar. 31, 2011

(65) Prior Publication Data
US 2011/0188750 A1    Aug. 4, 2011

(30) Foreign Application Priority Data
Sep. 25, 2009    (JP) ................................. 2009-221444

(51) Int. Cl.
*G06K 9/00* (2006.01)
(52) U.S. Cl.
USPC ........................................................ 382/167
(58) Field of Classification Search
USPC ................................................ 382/162–167
See application file for complete search history.

(56) References Cited

U.S. PATENT DOCUMENTS

| 5,539,468 | A |   | 7/1996 | Suzuki et al. |
|---|---|---|---|---|
| 5,638,496 | A | * | 6/1997 | Sato .............................. 358/1.9 |
| 6,243,416 | B1 |   | 6/2001 | Matsushiro et al. |
| 6,285,458 | B1 |   | 9/2001 | Yada |
| 6,668,086 | B1 | * | 12/2003 | Enokida ........................ 382/233 |
| 6,731,400 | B1 |   | 5/2004 | Nakamura et al. |
| 7,236,636 | B2 | * | 6/2007 | Sakai et al. ................... 382/238 |
| 7,321,693 | B2 |   | 1/2008 | Kadowaki |
| 7,576,888 | B2 |   | 8/2009 | Sakai et al. |

(Continued)

FOREIGN PATENT DOCUMENTS

| JP | 5-316360 | 11/1993 |
|---|---|---|
| JP | 09-83809 A | 3/1997 |

(Continued)

OTHER PUBLICATIONS

U.S. Appl. No. 12/898,229, filed Oct. 5, 2010. Applicants: Yoichi Kashibuchi, et al.

(Continued)

*Primary Examiner* — Stephen R Koziol
*Assistant Examiner* — Delomia Gilliard
(74) *Attorney, Agent, or Firm* — Fitzpatrick, Cella, Harper & Scinto

(57) ABSTRACT

In an image processing apparatus for dividing image data into blocks having a predetermined number of pixels and processing each of the divided blocks in sequence, color data of pixels in a block to be processed is compared to identify a pattern flag that corresponds to a placement pattern of the color data included in the block. The identified pattern flag and the color data for the number of colors included in the block are output and, assuming that output color data that corresponds to a pixel at a predefined position in the block is first color data, the pattern flag, the first color data, and other color data that are output for each of the divided blocks are collectively stored in respectively different memory areas.

14 Claims, 15 Drawing Sheets

(56) References Cited

U.S. PATENT DOCUMENTS

| | | | |
|---|---|---|---|
| 2003/0184546 A1* | 10/2003 | Kitamura | 345/426 |
| 2005/0062989 A1* | 3/2005 | Sakai et al. | 358/1.9 |
| 2008/0317362 A1 | 12/2008 | Hosaki et al. | |
| 2009/0097072 A1 | 4/2009 | Tamura | |
| 2009/0148059 A1 | 6/2009 | Matsuda | |
| 2009/0323132 A1 | 12/2009 | Yano et al. | |
| 2010/0123721 A1* | 5/2010 | Wong et al. | 345/469 |
| 2010/0128295 A1 | 5/2010 | Tamura | |

FOREIGN PATENT DOCUMENTS

| | | | |
|---|---|---|---|
| JP | 9-244832 | | 9/1997 |
| JP | 09244832 A | * | 9/1997 ................ G06F 3/12 |
| JP | 10-51642 A | | 2/1998 |
| JP | 10-136179 | | 5/1998 |
| JP | 10-257488 | | 9/1998 |
| JP | 2004-104621 | | 4/2004 |
| JP | 2004-153751 | | 5/2004 |
| JP | 2005-303606 A | | 10/2005 |
| JP | 2008-301373 | | 12/2008 |
| JP | 2008301373 A | * | 12/2008 |
| KR | 10-2005-0014724 A | | 2/2005 |

OTHER PUBLICATIONS

European Office Action dated Aug. 2, 2013 in European Application No. 10818685.9.

* cited by examiner

FIG. 3
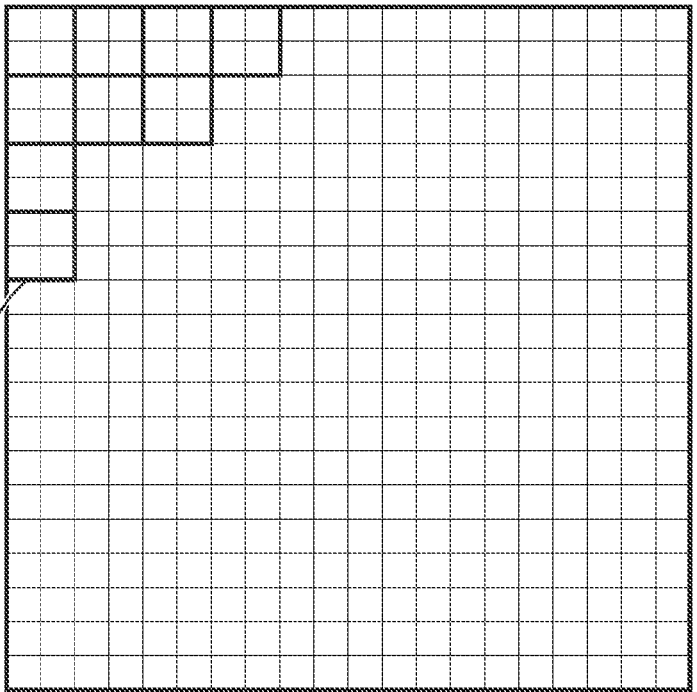
| IMAGE | |
|---|---|
|  | ALL PIXELS OF THE SAME COLOR: 1 PATTERN |
| 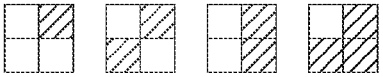 | 2 COLORS: 7 PATTERNS |
| 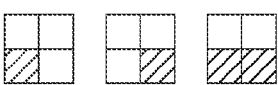 | 3 COLORS: 6 PATTERNS |
|  | ALL PIXELS OF DIFFERENT COLORS: 1 PATTERN |

FIG. 4

|  |  | 1-2 | 1-3 | 1-4 | 2-3 | 2-4 | 3-4 |
|---|---|---|---|---|---|---|---|
|  |  | bit0 | bit1 | bit2 | bit3 | bit4 | bit5 |
| PATTERN FLAG | PATTERN | COMPARISON RESULT | | | | | |
| 0 |  | 1 | 1 | 1 | 1 | 1 | 1 |
| 1 |  | 0 | 1 | 1 | 0 | 0 | 1 |
| 2 |  | 0 | 0 | 1 | 1 | 0 | 0 |
| 3 |  | 0 | 1 | 0 | 0 | 1 | 0 |
| 4 |  | 0 | 0 | 0 | 1 | 1 | 1 |
| 5 |  | 1 | 0 | 1 | 0 | 1 | 0 |
| 6 |  | 1 | 1 | 0 | 1 | 0 | 0 |
| 7 |  | 1 | 0 | 0 | 0 | 0 | 1 |
| 8 |  | 0 | 1 | 0 | 0 | 0 | 0 |
| 9 |  | 0 | 0 | 1 | 0 | 0 | 0 |
| A |  | 0 | 0 | 0 | 0 | 0 | 1 |
| B |  | 0 | 0 | 0 | 1 | 0 | 0 |
| C |  | 0 | 0 | 0 | 0 | 1 | 0 |
| D |  | 1 | 0 | 0 | 0 | 0 | 0 |
| E |  | 0 | 0 | 0 | 0 | 0 | 0 |

| COORDINATES (X,Y) | PACKET SIZE (Byte) |
|---|---|
| (0,0) | 32 |
| (1,0) | 48 |
| (2,0) | 36 |
| (3,0) | 128 |
| ⋮ | ⋮ |
| (X,Y) | 36 |

F I G. 16
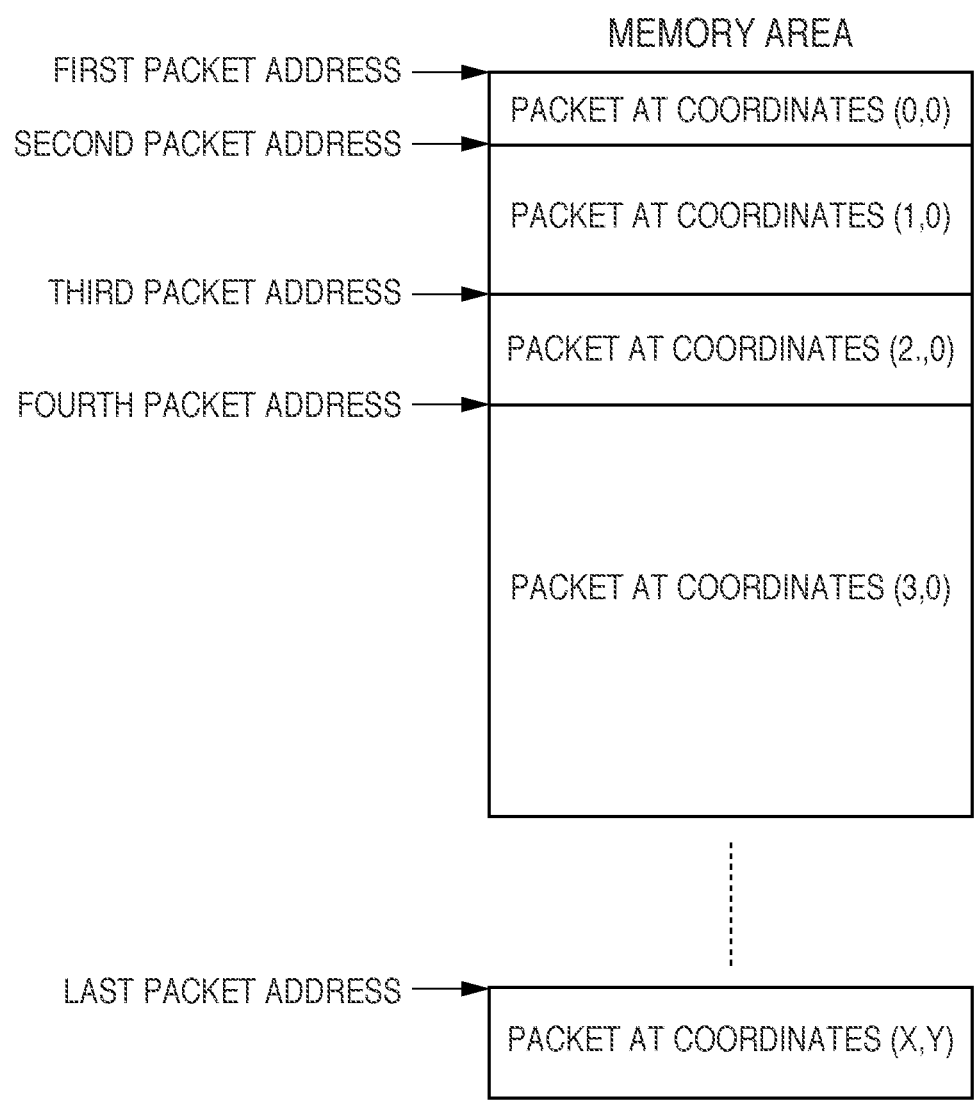

IMAGE PROCESSING APPARATUS AND PROCESSING METHOD THEREFOR

TECHNICAL FIELD

The present invention relates to techniques for compressing an image in predetermined blocks and for performing image processing and restoration processing on an image that has been compressed on a block-by-block basis.

BACKGROUND ART

Conventionally, high-resolution color images are in high demand, and digital multifunction peripherals deal with more and more images with resolutions of 1200 dpi or higher in order to meet the needs for high image quality. Not just digital multifunction peripherals, but image processing apparatuses such as digital cameras and facsimile machines also perform compression of color image data in order to save memory/hard disk capacity and to shorten the write time thereto, thereby achieving low cost and high speed.

Commonly used examples of color still image compression methods include JPEG methods using discrete cosine transform and other methods using Wavelet conversion. This sort of encoding scheme typically encodes an image into predetermined blocks (e.g., in units of 8×8 or 16×16 pixels) and performs discrete cosine transform, quantization, and entropy encoding to achieve high compression efficiency. The encoding scheme of this kind is a variable-length encoding method, in which the amount of encoding varies with each image to be encoded.

Because of the use of such a block-by-block variable-length encoding method, it is difficult to have random access to small areas for reference. Since the amount of encoding varies with each image and accordingly a block to be decoded has an indeterminate location (memory address), some means for determining the block location and block-by-block decoding processing are necessary for random access.

The discrete cosine transform in JPEG usually necessitates 8×8 pixels for the block size. In order to perform discrete cosine transform processing on the block-by-block basis at high speed, a high-speed computing unit and its dedicated hardware are necessary, and a buffer memory is also necessary.

As one approach to the issues such as random accessibility and the complexity of processing, an image compression technique is disclosed, in which the block size is small and a fixed compression rate is used (e.g., Japanese Patent Laid-Open No. 2004-104621).

There is also another issue in that, as the resolution continues to increase as described above, the number of pixels that require image processing increases dramatically, which increases the processing load. For example, if the resolution is doubled from 600 dpi to 1200 dpi, the number of pixels to be processed is quadrupled. In the case of using the image compression described above, processing for decoding compressed data would be necessary in order to refer to such pixel data and convert it. In other words, compressed data cannot be subjected as is to image processing and it always requires decoding processing, which makes it necessary to perform pixel-by-pixel processing on all pixels in high-resolution data and thus causes an increase in the processing time.

Examples of disclosed techniques for performing compression processing without encoding pixel data include a well-known run-length compression method for storing pixel data and the number of consecutive pixels, and a technique for performing compression by detecting edges in blocks and storing two colors at the edges (e.g., Japanese Patent Laid-Open No. 10-257488).

As described above, with the JPEG method using discrete cosine transform and the Wavelet conversion method, there is a problem in that a large amount of computations and accordingly a long processing time are necessary for each block, and also, costly processing hardware is needed.

There is also another problem in that an enormous amount of processing time is required depending on the number of pixels to be processed since image processing performed on compressed data always requires decoding processing.

For example, although high-resolution data is not always necessary depending on the application of image data, it is necessary to reduce high-resolution data to low-resolution data in order to obtain low-resolution data. In other words, decoding processing and separate reduction processing are always necessary in order to generate low-resolution data from high-resolution data that has been compressed and encoded in JPEG format, for example.

SUMMARY OF INVENTION

The present invention provides an apparatus and method for performing compression of image data while reducing the processing cost.

According to one aspect of the present invention, there is provided an image processing apparatus for dividing image data into blocks having a predetermined number of pixels and processing each of the divided blocks in sequence, the apparatus comprising: identification means for comparing color data of pixels in a block to be processed and identifying a pattern flag that corresponds to a placement pattern of the color data included in the block; output means for outputting the pattern flag identified by the identification means and the color data for the number of colors included in the block; and storage means for, assuming that color data output from the output means that corresponds to a pixel at a predefined position in the block is first color data, collectively storing the pattern flag, the first color data, and other color data that are output from the output means for each of the divided blocks in respectively different memory areas.

Further features of the present invention will become apparent from the following description of exemplary embodiments with reference to the attached drawings.

BRIEF DESCRIPTION OF DRAWINGS

FIG. 3 illustrates the number of all possible patterns of the four colors in a 2×2 pixel block.

FIG. 4 illustrates the relationship between the patterns shown in FIG. 3 and a pattern flag.

FIG. 16 is a diagram illustrating the addresses of packets written to the memory area.

DESCRIPTION OF EMBODIMENTS

Embodiments of the present invention will now be described in detail with reference to the accompanying drawings. In the embodiments of the invention, the description of an image processing apparatus takes the example of a digital multifunction peripheral (MFP) having multiple functions such as scanning, printing, and copying.

First Embodiment

Figure 1:
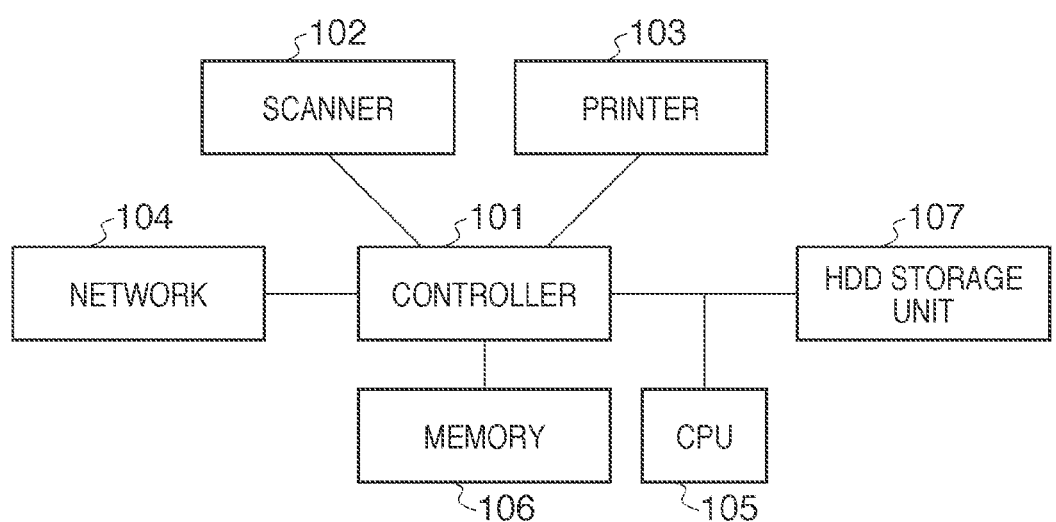
FIG. 1 is a block diagram illustrating an example of the configuration of an image processing apparatus according to an embodiment.

As shown in FIG. 1, a controller 101 is connected to a scanner 102 as image input equipment and a printer 103 as image output equipment. The controller 101 is also connected to a network 104 such as a LAN or a public network (WAN) to input and output image and device information and to perform image decompression of PDL data.

A CPU 105 is a processor that controls the overall MFP in accordance with computer programs stored in an HDD storage unit 107, which will be described later. A memory 106 is a system work memory for the CPU 105 to operate and is also an image memory for temporarily storing image data. The HDD storage unit 107 is a hard disk drive (HDD) that stores system software, computer programs, image data, and so on.

Figure 2:
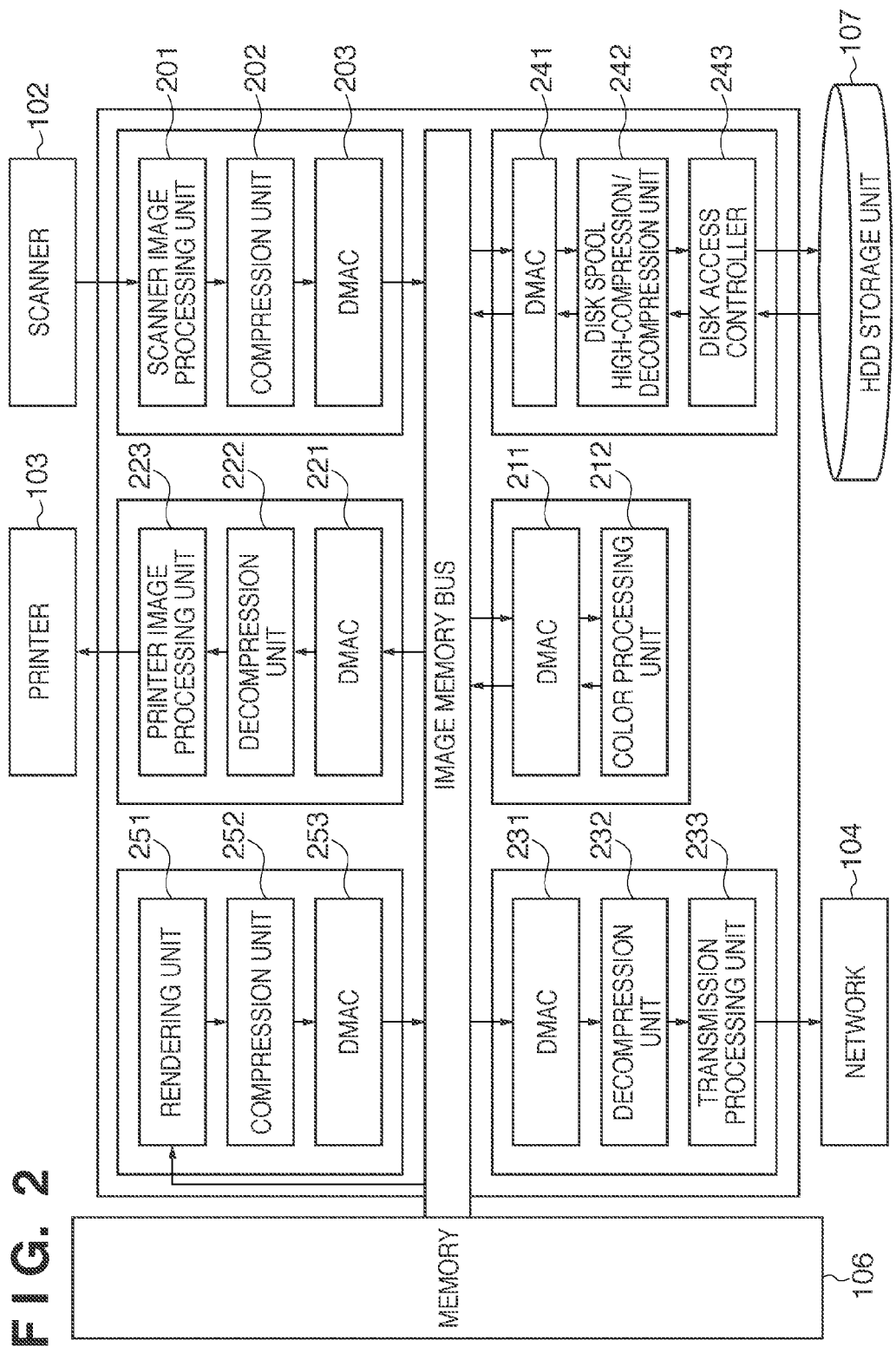
FIG. 2 is a diagram illustrating an exemplary configuration of a controller shown in FIG. 1.

Next is a detailed procedure of processing performed by each unit of the controller 101 with reference to an exemplary configuration of the controller 101 shown in FIG. 2. First is a description of the case of reading image data scanned by the scanner 102. A scanner image processing unit 201 receives an input of three-color, that is, RGB (red, green, and blue), image data scanned by the scanner 102 and performs image processing such as shading and filtering on the image data, and then a compression unit 202 performs image compression processing. Then, a direct memory access controller (DMAC) 203 stores the compressed data in the memory 106 via an image memory bus.

Next, in the case of printing scanned image data, a DMAC 211 transfers compressed data stored in the memory 106 to a color processing unit 212 via the image memory bus. Then, a color processing unit 212 converts it into CMYK (cyan, magenta, yellow, and black) color space. Thereafter, the color processing unit 212 further performs color processing such as density control and printer gamma correction on each of the CMYK values, and then the DMAC 211 stores the color-processed data again in the memory 106 via the image memory bus. After that, for execution of print image processing, a DMAC 221 reads the compressed data stored in the memory 106 via the image memory bus and a decompression unit 222 decompresses the data into raster image data. Then, a print image processing unit 223 receives an input of the CMYK raster image data, performs area converge modulation by means of dithering or error diffusion, and outputs it to the printer 103.

Moreover, in the case of transmitting scanned image data to the network, the DMAC 211 transfers compressed data stored in the memory 106 to the color processing unit 212 via the image memory bus. Then, the color processing unit 212 performs processing such as display gamma adjustment or paper ground color adjustment and then converts it into YCbCr (luminance, blue chrominance, and red chrominance) color space. Then, the DMAC 211 again stores the data processed by the color processing unit 212 in the memory 106 via the image memory bus. Thereafter, for execution of transmission image processing, a DMAC 231 transfers the compressed data stored in the memory 106 to a decompression unit 232 via the image memory bus. Then, the decompression unit 232 decompresses the compressed data into raster image data. After that, a transmission processing unit 233 performs either JPEG compression processing on the YCbCr raster image data for color image transmission or binarization and JBIG compression, for example, on the Y data for monochrome binary image transmission, and outputs the compressed data to the network 104.

Furthermore, in the case of storing scanned image data, a DMAC 241 transfers compressed data stored in the memory 106 to a disk spool high-compression/decompression unit 242 via the image memory bus. The disk spool high-compression/decompression unit 242 further performs high-compression JPEG compression since the write speed to the HDD is slower than that to the memory. Thereafter, the compressed data is stored in the HDD storage unit 107 via a disk access controller 243. In the case of transferring compressed data stored in the HDD storage unit 107 again to the memory 106, it is sufficient to perform the reverse of the above-described processing.

The following is a description of the case where PDL data that has been transmitted from another apparatus connected via the network 104 shown in FIG. 1 is written to the memory 106. Although a PDL interpretation unit is not shown in FIG. 2, the CPU 105 serving as a PDL interpretation unit interprets PDL data and outputs a display list as a result to the memory 106. Thereafter, a rendering unit 251 renders the display list stored in the memory 106 in RGB raster image data, and the compression unit 252 performs image compression processing. Then, the DMAC 253 stores the compressed data in the memory 106 via the image memory bus.

Note that processing for printing PDL data, transmitting it to the network, or storing it can be achieved by performing similar processing to that in the case of scanned image data.

Next is a detailed description of compression processing performed on raster image data, which is one of the features of the present invention. Note that although the compression unit 252 compresses a raster image generated from PDL data and the compression unit 202 compresses a raster image obtained by scanning in the present embodiment, the present invention is not intended to be limited to such a configuration. For example, the configuration may also be such that a common compression unit is provided, instead of providing the compression units 202 and 252 separately as shown in FIG. 2.

In the present embodiment, first, raster image data in pages is divided into 2×2 pixel blocks, and data compression processing is performed on each of the divided and extracted blocks.

Before giving a description of the compression processing, consider the number of possible color combinations in accordance with the number of colors contained in 2×2, that is, 4 pixel data. Since the number of pixels is four, the number of colors contained in those pixels is four at maximum, so only one to four combinations exist in a block. FIG. 3 illustrates the number of all possible patterns of the four colors.

First, in the case where a block contains a single color, it means that all four pixels are of the same color and thus there is only a single pattern. Next, consider the case where two colors exist in a block. As shown in FIG. 3, in the case where two colors are laid out in four pixels and assuming that the color of the upper left pixel is referred to as a first color and the other color is referred to as a second color, the remaining three pixels except the upper left pixel will have either the first or second color, from which it is evident that seven possible patterns in all are considered, except for the case where all four pixels are of the same color.

Then, consider the case where a block contains three colors. The number of occurrences that three colors are laid out within four pixels can be rephrased as the number of occurrences that only one of the three colors is used twice, so it is sufficient to obtain the number of occurrences that two pixels are the same color out of the four pixel coordinates. That is, the number of possible patterns of the three colors is six in all since it is equivalent to the number of combinations taking two out of the four coordinates. Finally, in the case where a block contains four colors, there is only a single pattern as in the case of a single color.

By totaling the numbers of all possible patterns of one to four colors, 15 patterns in all are considered. Also, if it is considered that a flag (identifier) is assigned in order to identify all those patterns, another 4 bits are necessary for the amount of flag data. The relationship between the 15 patterns and the flag is defined as shown in FIG. 4, and this flag is hereinafter referred to as a "pattern flag".

Figure 5:
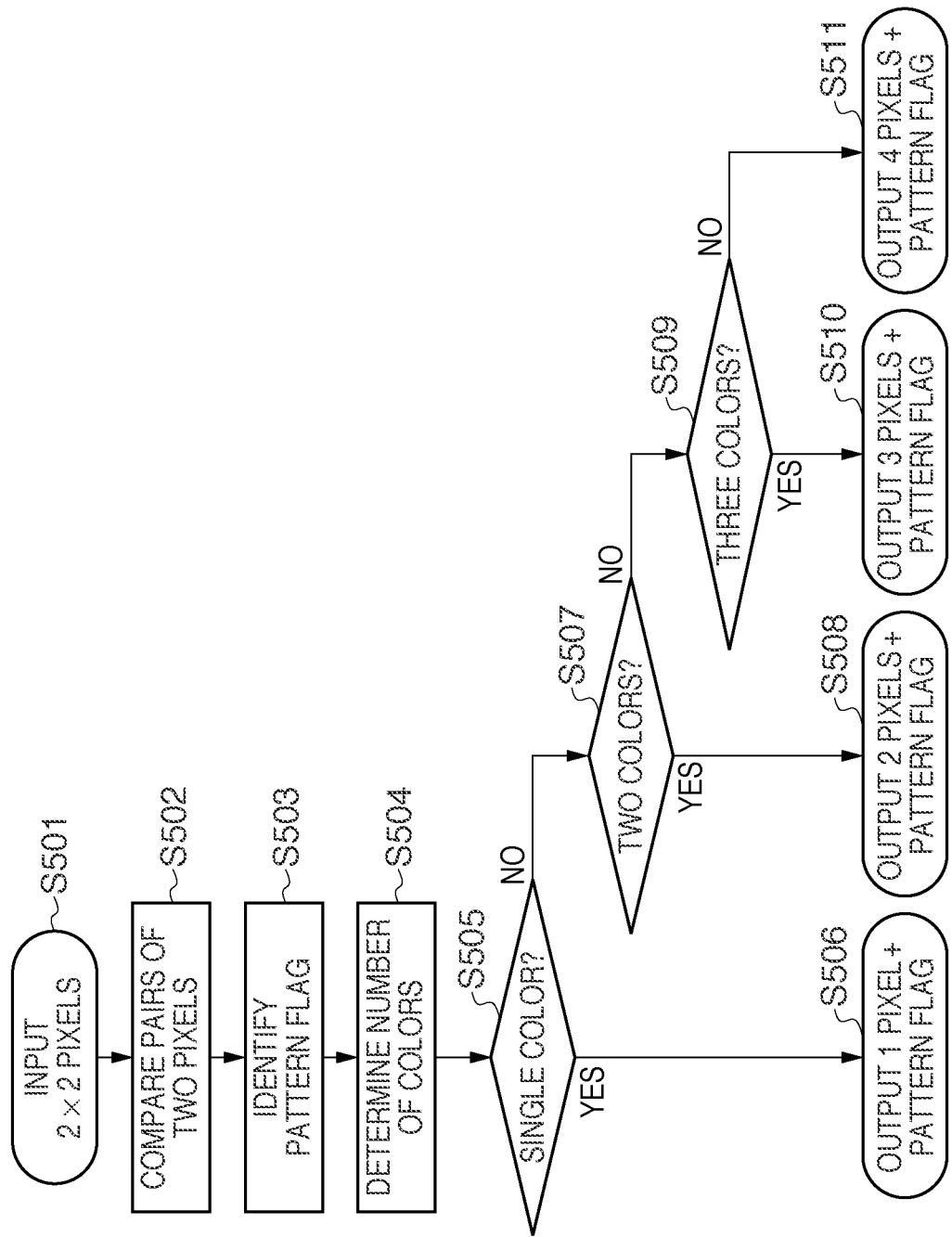
FIG. 5 is a flowchart showing processing for identifying a different number of pixels and a pattern flag.

As described above, in view of all possible patterns with 2×2 pixels, processing performed by the compression units 202 and 252 will be described with reference to FIG. 5. The description is given for example with the assumption that RGB have 8 bits or 256 levels each as input and such 8-bit data is dot-sequentially arranged, forming an image of 24 bits per pixel as data.

First, a 2×2 pixel block is input (S501) and all pairs of pixels in that block are compared with respect to their 24 bits (S502). As the result of the comparison, if all bits match, 1 is output, and if not, 0 is output.

Herein, 2×2 pixels have coordinates 1, 2, 3, and 4 in order of upper left, upper right, lower left, and lower right, respectively (as indicated by 401 in FIG. 4). Since the number of possible combinations of the two pixel coordinates is six in all, namely 1-2, 1-3, 1-4, 2-3, 2-4, and 3-4, (as indicated by 402 in FIG. 4), the comparison needs to be performed six times and accordingly six bits are output as a result. As shown by the comparison results in FIG. 4, if all pixels are of the same color, all comparison results are the output of 1, whereas if all four pixels have different pixel values, all comparison results are the output of 0.

In the present example, since the number of possible patterns that can occur by color matching of four pixels is 15, a 4-bit pattern flag is identified according to the 6-bit comparison result as shown in FIG. 4 (S503). Next, the number of colors found in four pixels and color data are extracted (S504). As shown in FIG. 4, since each pattern representing the location(s) of color(s) in a block is associated with the 4-bit pattern flag (or 6-bit comparison result), it is possible to identify the number of colors in each block and color data. Note that, in the present embodiment shown in FIG. 4, it is defined in all patterns that the color (pixel value) of the upper left pixel is a first color (first color data). In the case where the pattern flag is 0, the number of colors is one, so that the color (pixel value) of the upper left pixel is extracted as the first color. In the case where the pattern flag is any of 1 to 7, the number of colors is two, so that the color (pixel value) of the upper left pixel is extracted as the first color and further the color (pixel value) of a pixel at the position defined by the pattern flag where the second color (second color data) exists is extracted. For example, when the pattern flag is 1, the color of the upper right pixel is extracted as the second color. In the cases where the pattern flag is any of 8 to D, the number of colors is three, so that the color (pixel value) of the upper left pixel is extracted as the first color and further, the colors (pixel values) of pixels at the positions defined by the pattern flag where the second color (second color data) and the third color (third color data) exist are extracted. For example, when the pattern flag is 8, the color (pixel value) of the upper right pixel is extracted as the second color and the color (pixel value) of the lower right pixel is extracted as the third color. In the case where the pattern flag is E, the color of the upper left pixel is extracted as the first color, the color of the upper right pixel is extracted as the second color, the color of the lower left pixel is extracted as the third color, and the color of the lower right pixel is extracted as the fourth color.

That is, based on the pattern flag (or the comparison result), the number of colors in a block is identified (S505, 5507, and S509) and the pattern flag and color data corresponding to each block are output (S506, 5508, 5510, and S511). This output data is described with reference to FIG. 6.

Figure 6:
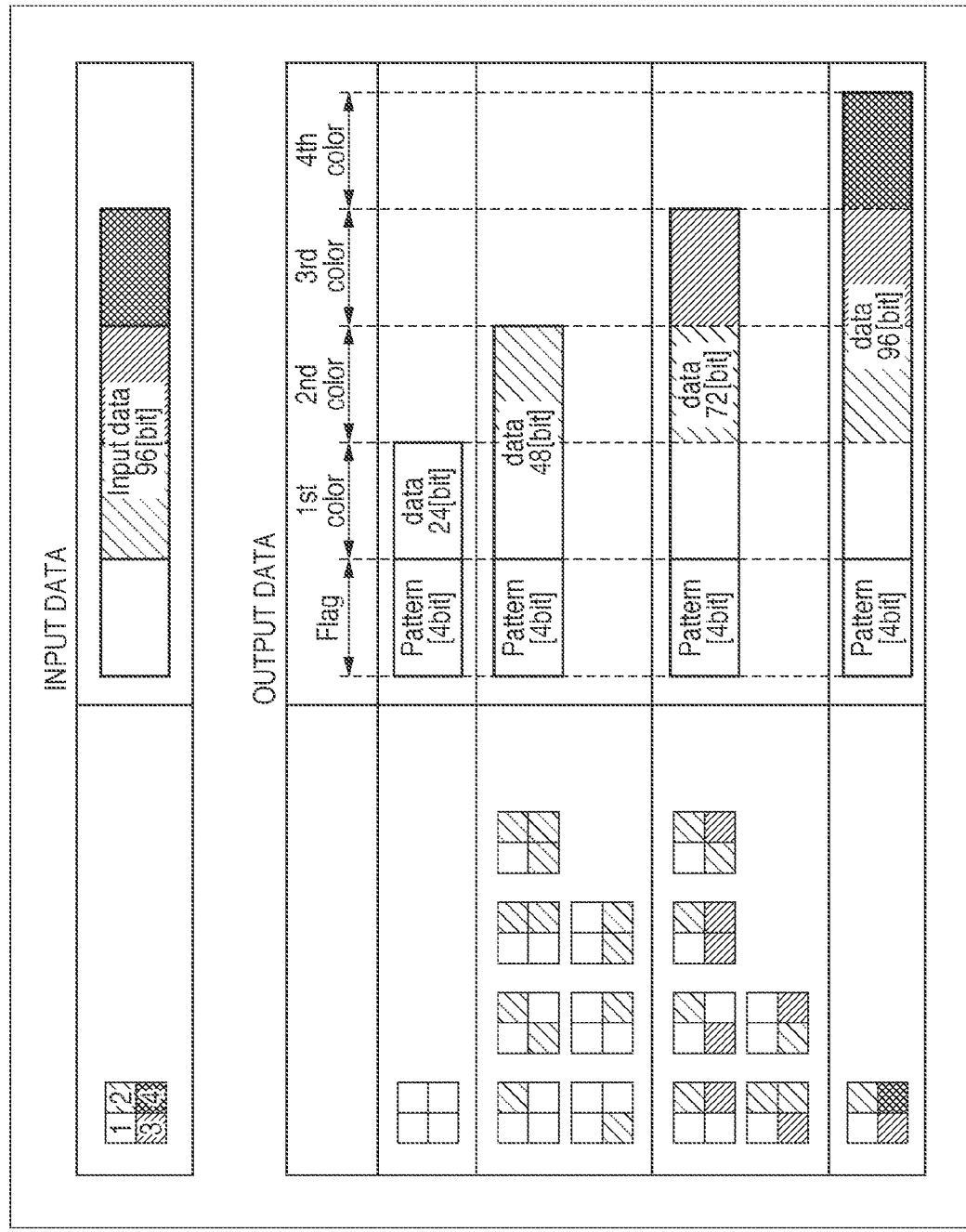
FIG. 6 is a diagram for illustrating processing for determining the positions of pixels having different pixel values.

As shown in FIG. 6, for example in the case where the pattern flag is 0 (i.e., four pixels are of a single color) (YES in S505), the 4-bit pattern flag and the pixel value for the first color (24-bit color data) are output since the second and other colors do not exist (S506). In the cases where the pattern flag is any of 1 to 7 (i.e., four pixels are of two colors) (YES in S507), the coordinates of the pixel where the second color exists is calculated using the pattern flag, and the 4-bit pattern flag and the pixel values for the two colors (48-bit color data) are output (S508). In the cases where the pattern flag is any of 8 to D (i.e., three colors) (YES in S509), the 4-bit pattern flag and the pixel values for three colors (72-bit color data) are output (S510). In the case where the pattern flag is E (i.e., four colors) (NO in S509), the 4-bit pattern flag and the pixel values for four colors (96-bit color data) are output (S511). In other words, outputting color data from each block is equivalent to outputting color data that has not appeared, in sequence from the first color when scanning is performed in order of the coordinates in a block (from 1 to 4 in order of upper left, upper right, lower left, and lower right).

In this way, outputting the 4-bit pattern flag and the pixel values for the number of colors existing therein for four-color input data (96 bits) in a 2×2 pixel block enables a reduction in the amount of output data with relatively simple processing. In particular for a raster image that contains many 2×2 pixel blocks where pixels are of the same color (i.e., blocks with a small number of colors), the amount of output data will have a high compression rate. It is also possible to identify the number of colors in a block by referring to the pattern flag. Performing such processing on all image blocks enables compression of the overall image data.

Next, the DMAC (203, 253) performs processing for writing the pattern flag and color data obtained as described above to the memory (memory storage processing). Here, the DMAC writes the pattern flag, the first color data, and the second, third, and fourth color data in different locations. Three addresses are specified to the DMAC, namely, a memory starting address to write the pattern flag, a memory starting address to write the first color data, and a memory starting address to write the second color data onward. In other words, the pattern flags of every block are stored collectively in a pattern-flag storage section of the memory (a memory area for storing the pattern flag). The first color data of every block is stored collectively in a first-color storage section of the memory (a memory area for storing the first color data of every block). Moreover, the second, third, and fourth color data of every block is stored collectively in a second-, third-, and fourth-color storage section of the memory (a memory area for storing the second, third, and fourth color data of every block).

Figure 7:
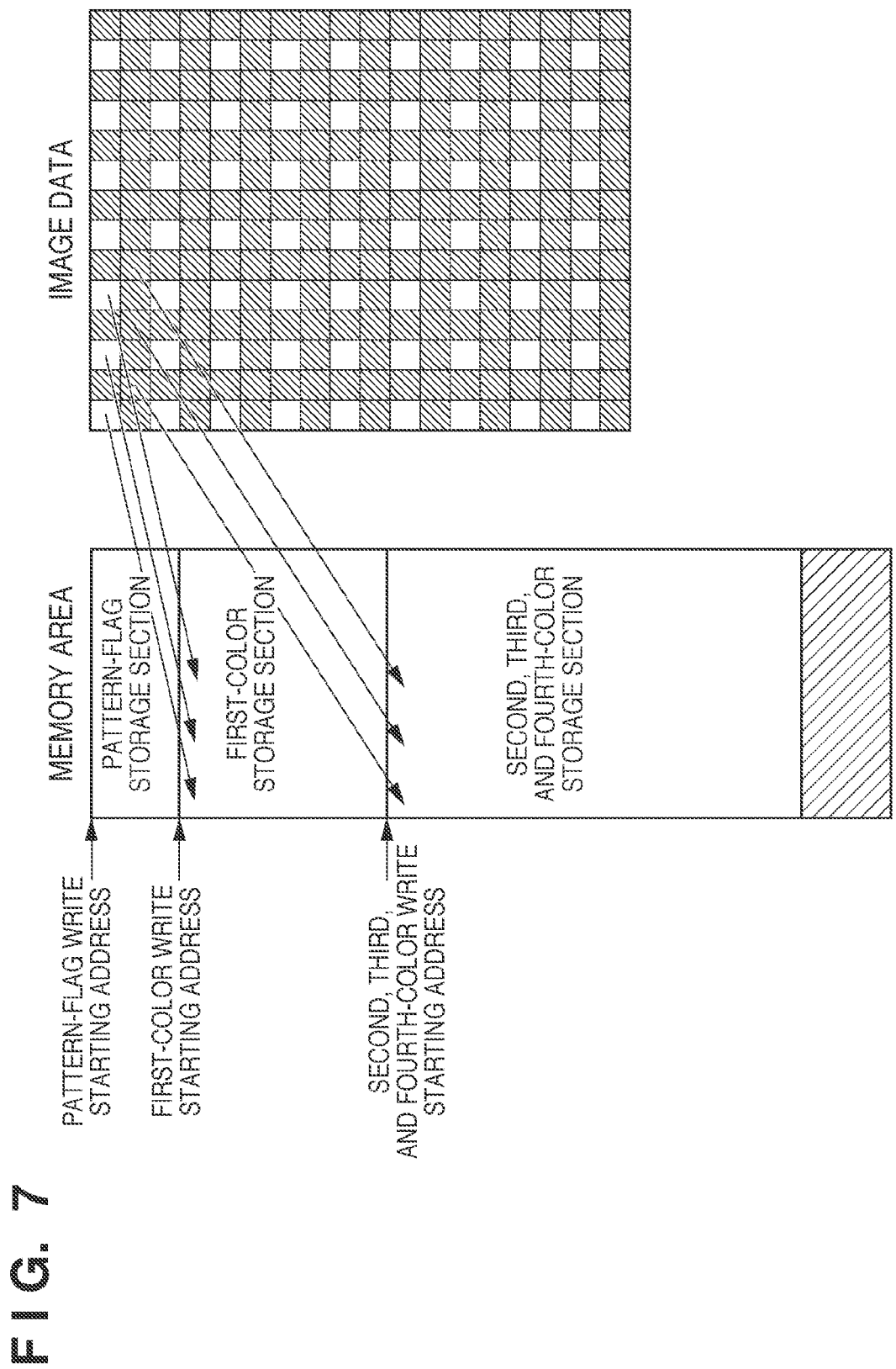
FIG. 7 is a diagram showing an example of image data writing to memory space by a DMAC.

FIG. 7 is a diagram showing an example of image data being written to memory space by the DMAC. Note that, when an M×N pixel image with RGB colors having 8 bits each is input into the compression unit, the data size of the pattern-flag storage section where pattern flag data is stored is (M×N×4/8) bytes. The data size of the first-color storage section where the first color data is stored is (M×N×24/8) bytes. The data size of the second, third, and fourth-color storage section where the second, third, and fourth color data is stored varies with each raster image to be processed. This is because the number of blocks where the second, third, and/or fourth colors exist varies with each image.

Here, as to the memory area after the first-color write starting address (the first-color storage section and the second-, third-, and fourth-color storage section), color data of each pixel is stored as is without changing the number of bits. That is, unlike compressed data such as in JPEG format, the color (pixel value) of each pixel can be identified without decoding compressed data into a raster image. Accordingly, in the case of performing color processing that is completed with one pixel input and one pixel output, such as color conversion and gamma correction processing using an LUT or color space conversion processing using matrix operations, it is possible to perform the processing directly on the data stored as shown in FIG. 7 without needing to return it to an original raster image. When the color processing unit 212 shown in FIG. 2 performs image processing on a pixel-by-pixel basis, pixel data after the first-color write starting address in the memory 106 is read via the DMAC 211, processed on a pixel-by-pixel basis, and then written back to the memory 106. Here, if some sort of pixel-by-pixel processing does not cause any change in the number of bits per pixel, data may be overwritten in the same place, which allows the space of the memory 106 to be saved.

Direct use of compressed data like this enables improvement in the transfer efficiency of the memory bus and increasing the processing speed since color data to be processed is less than the number of pixels in an original raster image.

Moreover, image data is divided into the pattern flag, the first color, and the other colors and stored discretely in the memory as shown in FIG. 7. Thus, the first-color storage section of the memory consecutively stores pixel values (color data) that are obtained by dividing a raster image into 2×2 pixel blocks and sampling the pixel at the upper left coordinates in each block.

The MFP also has functions such as previewing accumulated PDL image data or scanned image data and making network transmissions as described above. For example, even though the print resolution is 600 dpi, such a high resolution is often not required for preview or transmission, at which time a resolution of 300 dpi or lower would be enough. In cases where reduced data needs to be obtained like this, a half-sized raster image can be obtained in a simple way by collectively extracting only the first color data stored in the first-color storage section.

The following is a description of size reduction and transmission, for example in a case where a 600 dpi raster image has been converted into and accumulated as data as shown in FIG. 7. If 300 dpi is specified as the resolution of an image to be transmitted, it is sufficient to extract and transmit the data stored in the first-color storage section as it is. If the resolution specified is higher, such as 400 dpi, than the sampling resolution of 300 dpi in the first-color storage section, the following processing is performed. Specifically, compressed data is decompressed based on the data stored in the pattern-flag storage section, the first-color storage section, and the second-, third-, and fourth-color storage section, then the decompressed data is scaled using known scaling processing, and the scaled image is transmitted. If a transmission resolution lower than 300 dpi is specified, only the data stored in the first-color storage section is used to perform scaling processing to obtain the specified resolution. In this way, it is sufficient to read data while switching it in accordance with the desired image size.

Next is a description of the decompression units 222 and 232 paired with the compression units 202 and 252. Note that the decompression units 222 and 232 perform processing for restoring the pattern flag and color data as described above into raster image data. Three addresses are specified to the DMACs 221 and 231, namely, the pattern-flag write storage address, the first-color write starting address, and the second-, third-, and fourth-color write starting address for compressed data laid out in the memory 106 as shown in FIG. 7. The DMACs 221 and 231 read data from the three addresses and transfers it to the decompression units 222 and 232.

The decompression units 222 and 232 first interpret the 4-bit pattern flag and calculate the number of colors in that block. In addition to the first color data, they also read the second, third, and/or fourth color data in accordance with the number of colors and relocate the first color and the second, third, and fourth color data in accordance with a color data placement pattern (FIG. 4) that has been predefined for each pattern flag. In this way, each 2×2 pixel block is decompressed and decoded.

In a case where the decompression units 222 and 232 reduce the image size to half, only the first-color write starting address is specified to the DMACs 221 and 231 since the pattern flag and the second, third, and fourth color data are unnecessary as described above. Thereby, only the first color data is read from the memory 106 to constitute an image. Such processing enables a savings in the bandwidth of the memory bus.

The first embodiment enables not only a savings in the memory capacity and the bandwidth of the memory bus with a relatively simple compression method, but also reducing processing loads at the time of pixel-by-pixel image processing or size reduction and scaling processing.

Note that although the patterns indicating the locations of color data and the pattern flag are associated as shown in FIG. 4 in the first embodiment, the present invention is not intended to be limited thereto. For example, the association between the patterns indicating the locations of color data and the pattern flag may be associated and predefined such that the pixel value of the lower right pixel in each 2×2 pixel block is the first color. Also, although the description of the first embodiment has been given with the assumption that the block size is 2×2 pixels, the present invention is not intended to be limited thereto. Moreover, although the description of the compression has taken the example of image data with RGB having 8 bits each, image data may be in CMYK color space, or it may be gray-scale data, or it may have a pixel value other than 8 bits.

Second Embodiment

Next is a detailed description of a second embodiment according to the present invention with reference to the drawings. In the second embodiment, a description is given of processing for compressing scanned image data. Note that the description of the second embodiment also takes the example of an MFP as an image processing apparatus as in the first embodiment.

Images that are expected to be highly compressed by the compression method of the first embodiment are those that contain many areas in which adjacent pixel values do not have even a single level of difference therebetween. Specifically, raster image data rendered as high-resolution PDL data (e.g., a document image generated by word-processing software) would likely have a high compression rate. On the other hand, scanned input images would likely have noise components of a scanner superimposed thereon and thus can contain many areas in which adjacent pixel values have several levels of difference therebetween.

In such cases, 2×2 pixel blocks of compressed data are more often determined to be of four colors, which not only results in no reduction in the amount of data after compression but also makes it more likely that the amount of data will be increased by the addition of the pattern flag. However, in some images, several levels of difference in a 2×2 pixel block cannot often be recognized visually, in which case it can be said that such several levels of difference are redundancy data.

Thus, a description is given in the second embodiment of a method that enables high compression of scanned image data as well. As described above, if pixels in a block have only several levels of differences therebetween, they are considered as the same color and color-reduction processing is performed on each block, which enables a reduction in the number of blocks that are determined to be of four colors and an improvement in the compression rate.

Figure 8:
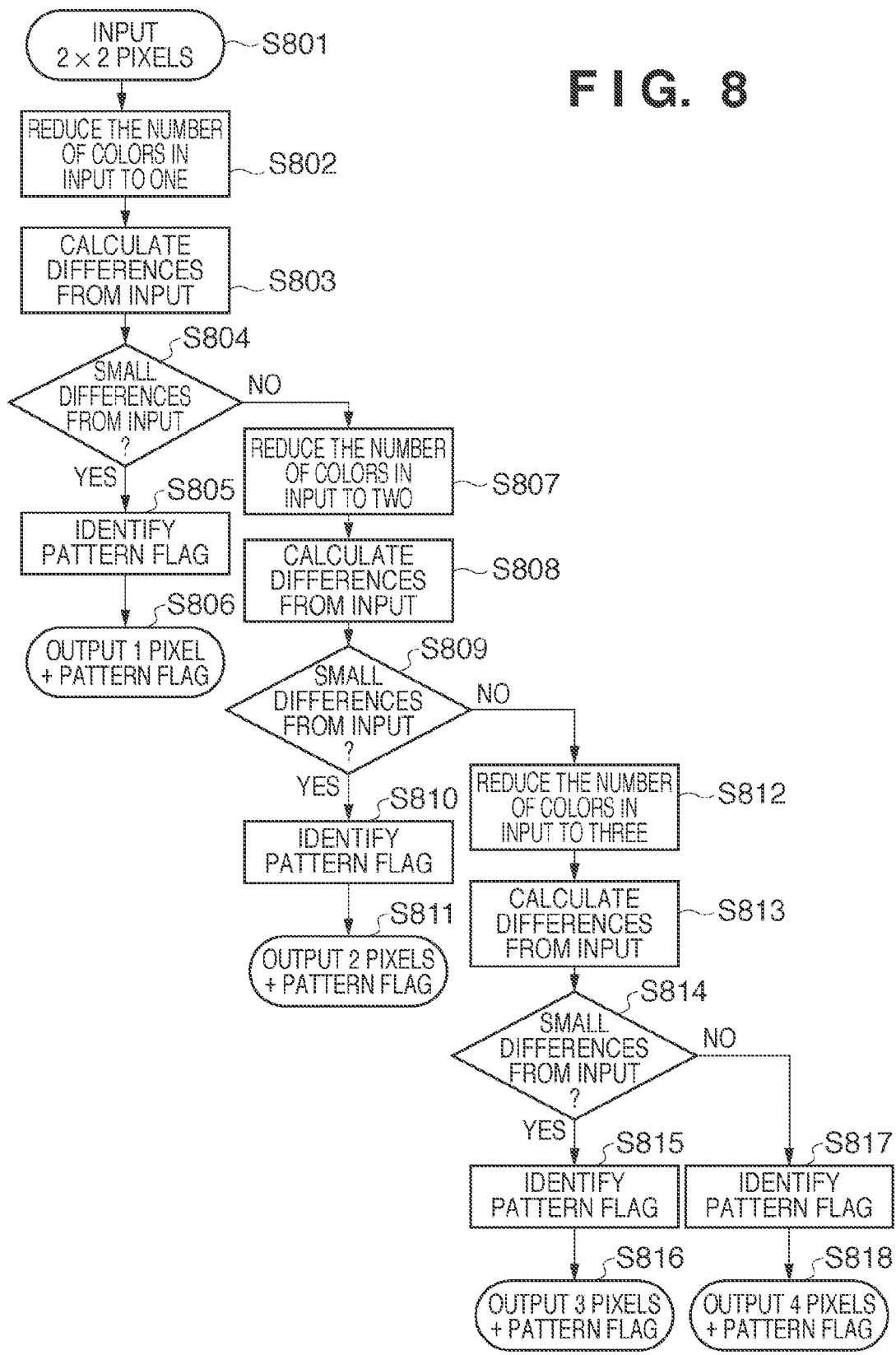
FIG. 8 is a flowchart showing compression processing according to a second embodiment.

After the color-reduction processing is performed on each block, image compression processing is performed based on all possible patterns with 2×2 pixels as shown in FIG. 4 of the first embodiment, which will now be described with reference to FIG. 8. As in the first embodiment, the description is given of the case where the RGB colors have 8 bits or 256 levels each as input.

First, a 2×2 pixel block to be processed is input (S801) and color-reduction processing is performed, in which a single color is obtained from the four pixel values (S802). Here, such color-reduction processing to obtain a single color can be achieved by calculating an average pixel value of the four pixels, for example. Specifically, differences between the pixel value obtained by color-reduction processing and the input four pixel values are calculated (S803) and the magnitude of the differences is determined (S804). For example, the sum of the absolute values of the differences between the input pixel values and the RGB values after the color-reduction processing is obtained, and if the sum is not more than a threshold value, the differences can be determined to be small. Specifically, if the differences are determined to be small, it is determined that the number of colors can be reduced to one, so the pattern flag is identified as 0 (S805) and a single pixel value obtained by the color-reduction processing and the pattern flag are output (S806).

If the differences are determined to be large, then other color-reduction processing is performed to obtain two colors (S807). Here, the number of colors can be reduced to two, for example, by extracting two pixels A and B whose differences in RGB values are the largest among the four pixels, then clustering the remaining two pixels into either of the two pixels A and B depending on to which it is more similar, and then obtaining an average value in each of the clusters. Then, differences between the two color pixel values and the input four pixel values are calculated (S808) and the magnitude of the differences is determined (S809). Here, if the differences are determined to be small, the pattern flag is identified in accordance with the positions of the pixel values after the number of colors is reduced to two, based on the correspondences as shown in FIG. 4 in the same manner as described in the first embodiment (S810). Then, the two color pixel values obtained by the color-reduction processing and the pattern flag are output (S811).

Here again, if the differences are determined to be large, then other color-reduction processing is performed to obtain three colors (S812). Here, the number of colors can be reduced to three, for example, by extracting two pixels whose differences in RGB values are the smallest among the four pixels, then obtaining an average value of the two pixel values, and adding the average pixel value to the other two pixel values to have three colors. Then, differences between the three color pixel values and the input four pixel values are calculated (S813) and the magnitude of the differences is determined (S814). If the differences are determined to be small, the pattern flag is identified in accordance with the positions of the pixel values after the number of colors is reduced to three, based on the correspondences as shown in FIG. 4 in the same manner as described in the first embodiment (S815). Then, the three color pixel values obtained by the color-reduction processing and the pattern flag are output (S816).

Here again, if the differences are determined to be large, it is determined that performing color-reduction processing on that block can cause visual problems, so the pattern flag is identified as E (S817) and all four pixel values and the pattern flag are output (S818).

The pattern flag and the pixel values (color data) output in this way are stored separately in the area for storing the pattern flag, the area for storing the first color data, and the area for storing the second, third, and fourth color data other than the first color data, as shown in FIG. 7.

According to the second embodiment, treating similar colors as the same color enables improvement of the compression rate of such images as typified by scanned images whose compression rate can be degraded dramatically due to several levels of difference between pixel values. It is also possible, by appropriately setting the threshold value used for the aforementioned determination of differences, to control the compression rate and image quality. For example, if no tolerance is allowed (i.e., the threshold value is set to 0), completely lossless image compression is performed. On the other hand, if an infinite value is set as the tolerance, each block will be represented by a single color, which is equivalent to reducing the resolution to half and thus assures that the amount of data can be reduced to one fourth. By providing a user interface for setting such a threshold value, each user can set the desired image quality and compression rate.

Although the compression method using color-reduction processing has been described in the second embodiment, it is not necessary when performing decompression processing to take into consideration whether or not the compression method has been accompanied with color-reduction processing, so completely the same configuration as used in the first embodiment can be used.

Moreover, the compression method using color-reduction processing described in the second embodiment is merely one example, and can also be implemented by using any other known color-reduction processing. For example, another known technique for obtaining color differences may be used instead.

Third Embodiment

Next is a detailed description of a third embodiment according to the present invention with reference to the drawings. In the third embodiment, a description is given of the case where attribute data associated with each pixel is compressed, in addition to raster image data compressed as described in the first and second embodiments. Note that the description of the third embodiment also takes the example of an MFP as an image processing apparatus as in the first and second embodiments.

In a raster image generated by rendering PDL data, an attribute can be added to each pixel. Examples of the attribute include character, photograph, graphics, background, and gray compensation. For images with such attributes, image processing appropriate for each attribute is performed while switching the contents of the processing, which allows optimal images to be obtained. For example, it is conceivable that processing for improving contrast for higher readability may be performed on pixels having a character attribute, and processing for enriching tone may be performed on pixels having a photograph attribute.

An image associated with such attribute information is generated by the rendering unit 251 shown in FIG. 2, and data of the image is stored in the memory 106 via the compression unit 252 and the DMAC 253 as described above.

When reading an image including attribute data from the memory 106 via the DMAC 211, the color processing unit 212 performs conversion processing of pixel values while switching image processing depending on the attribute data.

Thus, in the third embodiment, a description is given of a method for enabling excellent compression of image data including attribute data with the compression methods described in the first and second embodiments. Note that a description is given of image compression processing performed based on all possible patterns with 2×2 pixels as in the first and second embodiments. Basically, an approximate procedure is identical to those described in the first and second embodiments and thus described with reference to the same drawings. It is assumed that input contains 8-bit attribute data per pixel, in addition to RGB colors having 8 bits or 256 levels each. Here, it is assumed that the 8-bit attribute data is stored as an index value such as a value A for characters and a value B for photographs. Also, the attribute data may have multiple meanings and thus the attribute can mean both character and gray compensation, for example.

With a compression method that does not allow even a single level of difference as in the first embodiment, attribute data and pixel value data are treated in the same way and it is sufficient to expand the 24-bit comparison of the RGB to 32-bit comparison of both the RGB and the attribute. However, in the case of compression using color-reduction processing, such simple expansion will cause problems since attribute data is an index value.

In the aforementioned embodiments, 24 bits of the pixel values of pixels are compared to determine if they are of the same color, and differences of those 24 bits are calculated and treated as differences between pixels. In other words, the definition of the same color is such that the pixel values are the same or, in the case of color-reduction processing, they are similar enough to be regarded as the same. If the pixel value is simply increased by 8 bits of attribute data and treated as a 32-bit pixel value, the same color has different meanings. This is because, since the value of attribute data means an index, the determination of whether it is similar or dissimilar cannot be made by only the difference in value. Accordingly, when attribute information is added to the pixel value, it is necessary to change the method of color-reduction processing or difference calculation from the method using only pixel values.

A description is given of color-reduction processing in the aforementioned compression processing, with the addition of attribute data. Since the attribute data has meaning in the index as described above, it is unable to simply obtain an average value or the like. Thus, for example, priorities, such as the character attribute deserving higher priority than the background attribute, are assigned to the attribute, and in the case where an average of n pixels is obtained, the attributes of those pixels are replaced with the highest-priority attribute among them. With such a method, the aforementioned color-reduction processing is performed on 24 bits of the pixel value representing the color tone, whereas priority considered replacements are performed for color-reduction processing of the attribute data. This enables color-reduction processing of pixel data including attribute data.

Next is a description of the difference calculation processing in the aforementioned compression processing. In the difference calculation, the sum of the absolute values of the differences for 24 bit pixel values is obtained, and the difference between attribute data is added to this after having performed some sort of evaluation in which a scale is applied to the absolute values of the differences of the pixel values. For example, if the attribute of pixel values change from photograph to character, the amount of that change is considered equivalent to 30 levels of change in pixel values, so it is added to the sum of the absolute values and compared with a threshold value.

Such a difference in attribute data is difficult to calculate and thus may be stored in a table. With such a table, for example in a case where the attribute of even a single pixel is not allowed to change, maximum values can be set to all values in the table so that color-reduction processing that can cause a change in attribute will not be performed. In contrast, in a case where pixels having the same pixel values need to be regarded as the same color even though they have different attributes, 0 can be set to all values in the table so that any difference in attribute will be treated as 0 irrespective of any change in attribute and whether or not to perform color-reduction processing will depend only on differences between pixel values.

According to the third embodiment, compression processing can be performed even in the case of handling image data with attribute data assigned to each pixel. Although the compression of attribute data described herein focuses on PDL images, similar compression processing can also be performed on scanned images with attribute data assigned by image recognition. Moreover, attribute data is not intended to be limited to 8 bits per pixel and may contain any number of bits, such as a single bit, four bits, or 16 bits.

Fourth Embodiment

Next is a detailed description of a fourth embodiment according to the present invention with reference to the drawings. In the fourth embodiment, a description is given of other processing for compressing the raster image data described in the first and second embodiments. Note that the description of the fourth embodiment also takes the example of an MFP as an image processing apparatus as in the first embodiment.

Images that are expected to be highly compressed by the compression methods of the aforementioned embodiments are those that contain many areas in which adjacent pixel values either represent the same color or differ only by levels small enough to be regarded as the same by execution of color-reduction processing. Focusing on such image areas, pixel values not only within a 2×2 pixel block but also those in areas including adjacent 2×2 pixel blocks often represent the same color or differ only by levels small enough to be regarded as the same color.

Thus, in the fourth embodiment, a description is given of a compression method that focuses on the similarity of adjacent blocks, in addition to the compression methods that focus on only compression within blocks, which have been described in the foregoing embodiments. In FIG. 4, 15 possible pattern flags for a 2×2 pixel block are represented by 4 bits. Since 4 bits allow representation of 16 patterns, there still remains space for description of one more pattern, that is, the pattern flag has redundancy.

Thus, the pixel values of the previous block of a currently processed block are stored in that space, and if it can be determined that all pixels match those of the current block (or are similar enough after execution of color-reduction processing), a flag indicating that the current block is the same as the previous one is set without outputting the pixel values (color data) of the current block. By allocating this pattern flag to the remaining 4-bit pattern, data can further be compressed without changing the number of bits of the pattern flag described in the aforementioned embodiments.

Figure 9:
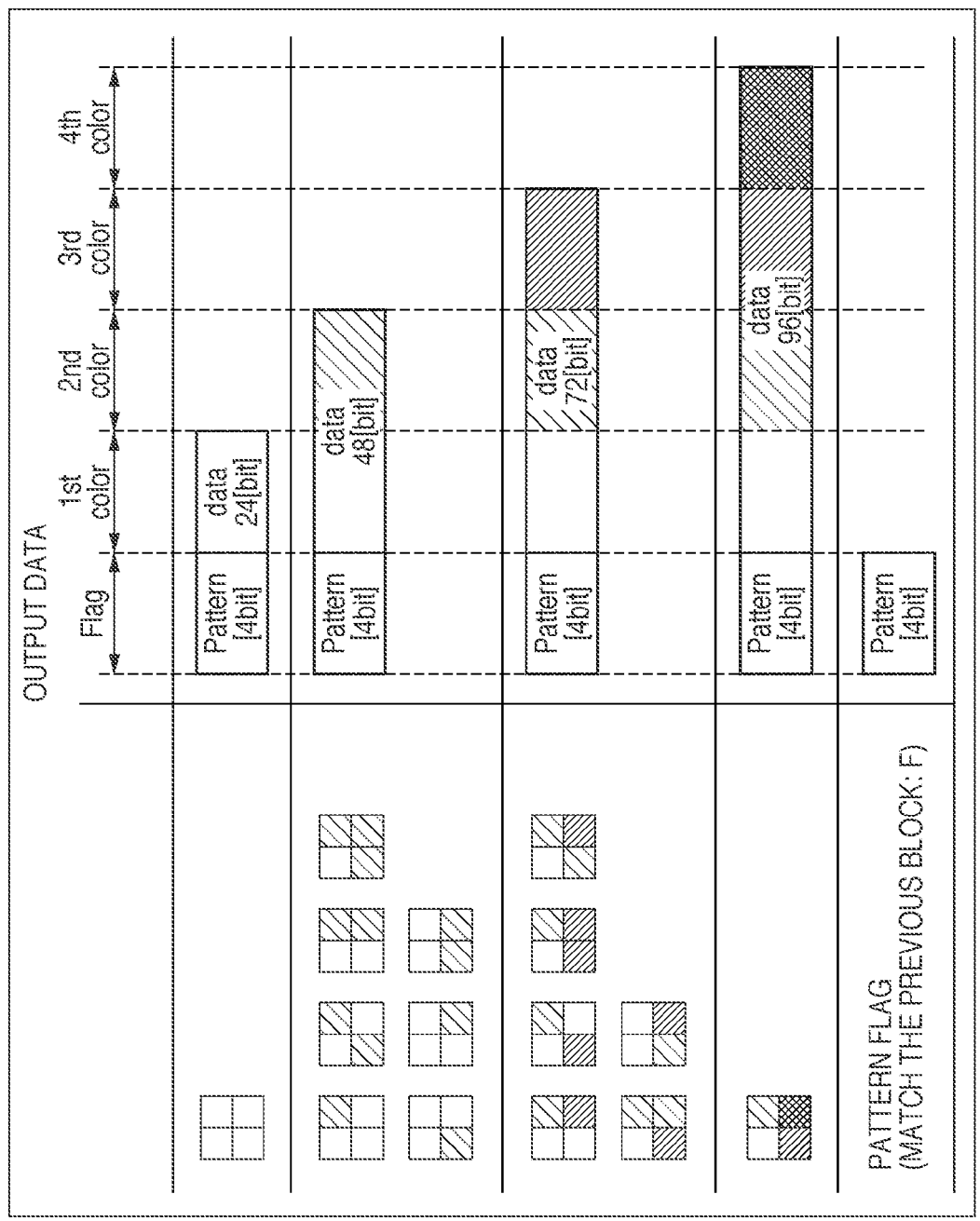
FIG. 9 is a diagram showing the relationship between input and output in the case of adding a new pattern flag.

FIG. 9 is a diagram illustrating the number of bits in the case where the flag (hereinafter referred to as a "repeat flag") indicating that the current block has the same pattern as the previous block is added as a new pattern flag. In the present example, the pattern flag "F" is added to represent matching with the previous block (i.e., new pixel values are not output). As shown in FIG. 9, a block having the pattern flag F can be represented by the 4-bit pattern flag. In other words, a block with the pattern flag F can be decompressed by referring to the pixel values (color data) of the previous block and the pattern flag, which eliminates the need to store the pixel values (color data) and improves the compression rate.

Figure 10:
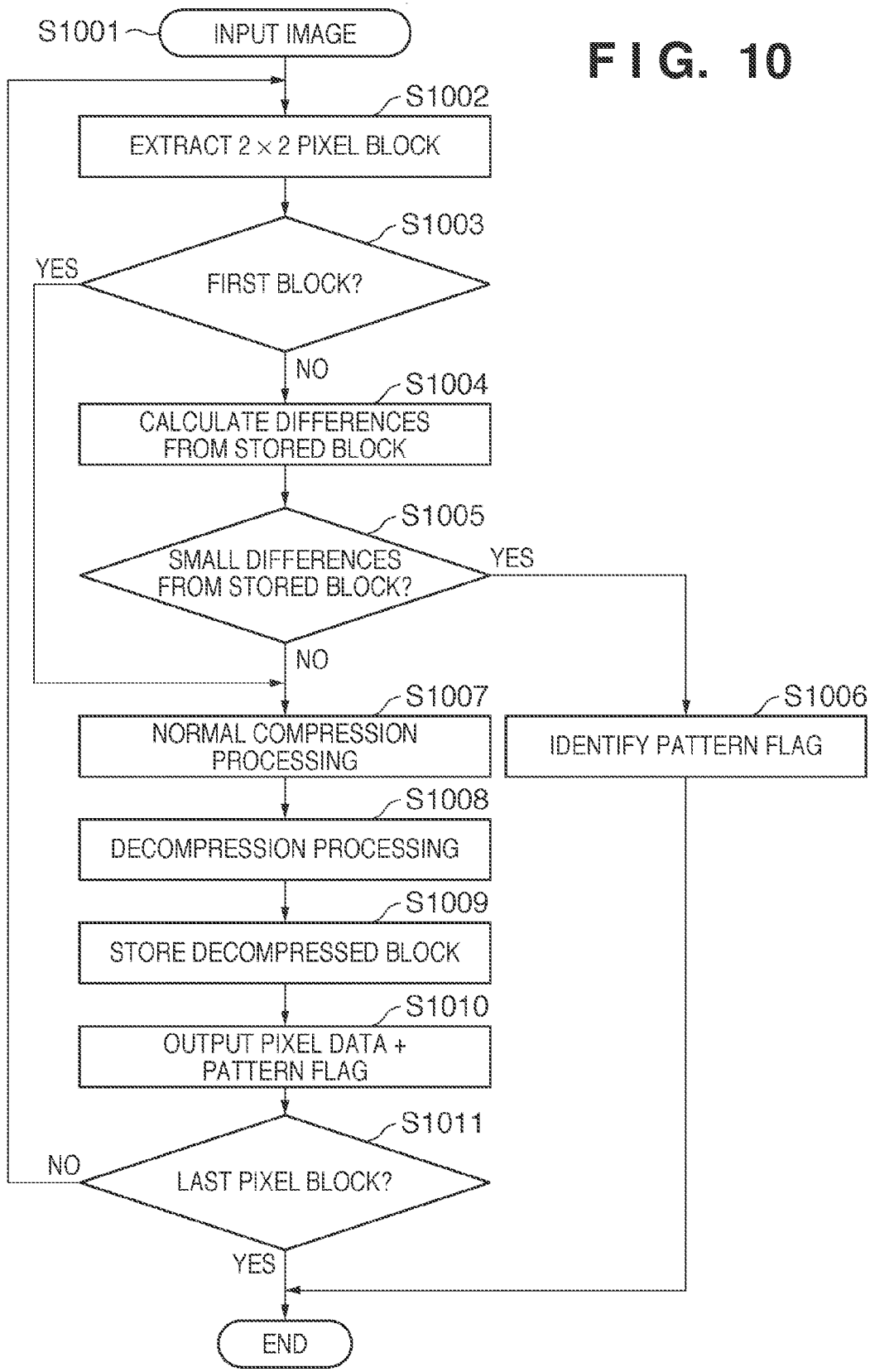
FIG. 10 is a flowchart showing compression processing according to a fourth embodiment.

The following is a detailed description of the compression processing according to the fourth embodiment with reference to FIG. 10. First, raster image data is input (S1001) and a 2×2 pixel block is extracted therefrom (S1002). Next, if the extracted block is an initial block (YES in S1003), then compression processing is performed in the same manner as described in the above embodiments since no prior block exists (S1007). On the other hand, if the extracted block is determined as not being the initial block in S1003, differences from the previously processed and stored block are calculated (S1004). This processing can be performed, for example, by obtaining the sum of the absolute values of the differences between pixel values at the same coordinate positions. Here, if the difference is smaller than a threshold value, it is determined that the same data as the previous block that was last stored can be used (YES in S1005). Then, the pattern flag is identified as "F" indicating that the current block is the same as the previous block (S1006), so the output of the pixel values (color data) is omitted. In other words, if the difference between the block to be processed and the previous block to be processed is determined to be small, the pattern flag F (repeat flag) indicating a repetition of the previous block is output for the block to be processed.

If the difference is not smaller than the threshold value in S1005, it is determined that the data of the previous block cannot be reused because of a large difference from the previous block, and normal compression processing is performed as described in the above embodiments (S1007). Thereafter, the data is decompressed (S1008) and the decompressed 2×2 pixel block is stored as updated "previous block data" (S1009). Although the previous block data is updated in S1008 and S1009 after execution of the compression processing in S1007 in the present embodiment, the present invention is not intended to be limited thereto. For example, the previous block data may be updated using the pixel values of the block to be processed, prior to execution of the compression processing in S1007.

Next, the pattern flag and the color data obtained as a result of normal compression processing in S1007 are output for a block whose difference from the stored block is not smaller than the threshold value, whereas only the pattern flag F is output for a block whose difference is small (S1010). By repeating this processing until the last block (YES in S1011), the compression processing of the whole image is completed.

Although the compression rate can reliably be improved as compared with the case of the aforementioned embodiments since the number of bits of the pattern flag is not increased and remains the same, that is, 4 bits, the first color data has an indeterminate image size (varies with images) like the second, third, and fourth color data.

Figure 11:
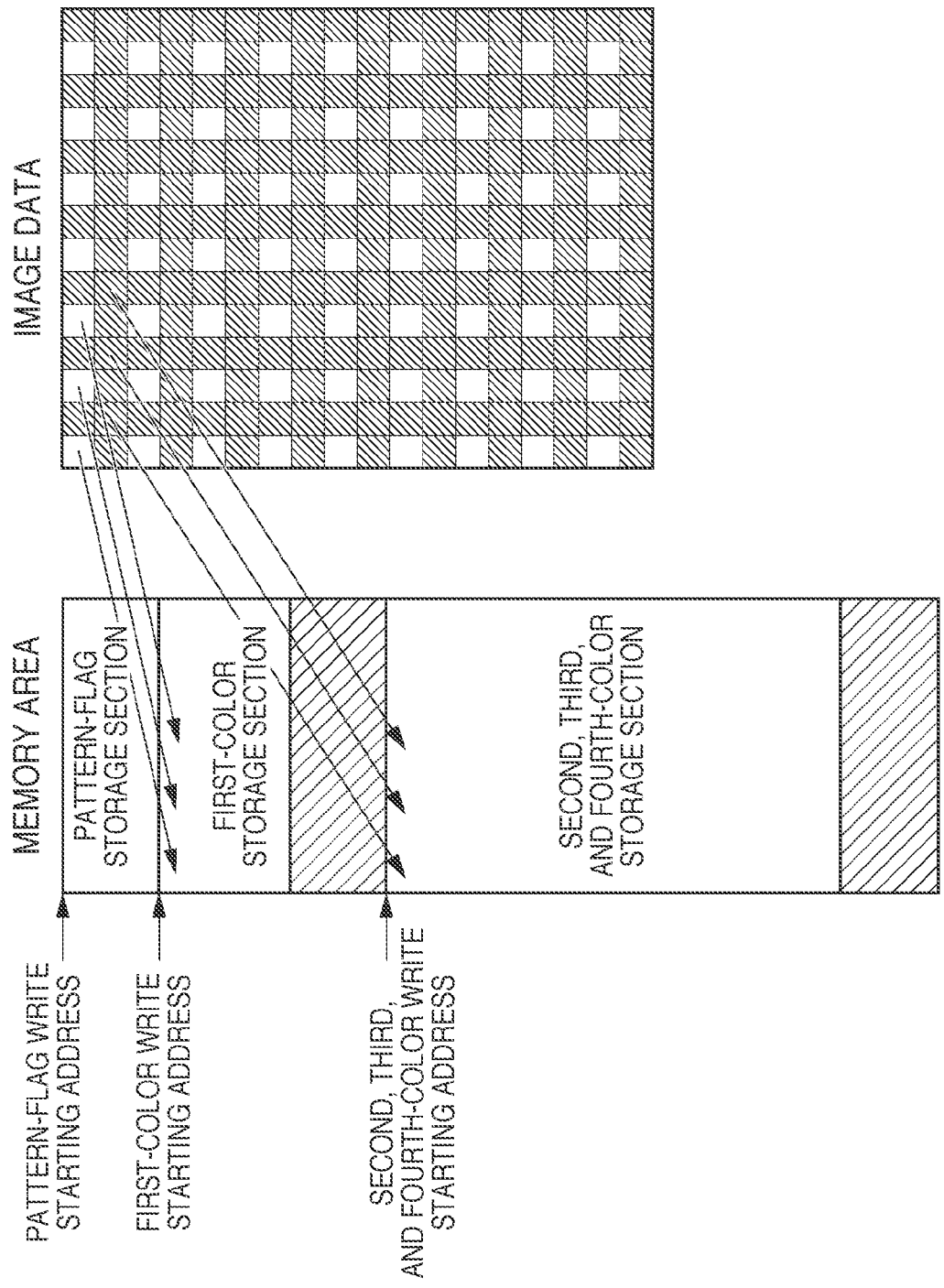
FIG. 11 is a diagram showing an example where image data is written to the memory area according to the fourth embodiment.

Accordingly, as shown in FIG. 11, the first color data and the second, third, and fourth color data cannot be stored in consecutive memory space, and it is necessary to discretely store the first color data and the second, third, and fourth color data. In the previous description, the color processing unit 212 shown in FIG. 2 can read pixel data after the first-color write starting address in the memory 106 via the DMAC 211 and can write it back to the memory 106 after completion of pixel-by-pixel processing. However, in the fourth embodiment, it is necessary to specify the second, third, and fourth-color write starting address, in addition to the first color address, to the DMAC 211 of the color processing unit 212 since the first color data and the second, third, and fourth color data are not stored in consecutive memory space.

In the present example, although the previous left block is defined as the previous block and the state of matching or mismatching with that block is stored, the present invention is not intended to be limited thereto. For example, matching with a broader area can be defined by using upper blocks for matching or expanding the number of bits of the pattern flag.

Next is a description of decompression processing paired with the compression processing. The decompression processing is processing for restoring the pattern flag and the pixel data, described above, into raster image data. The three addresses of compressed data located in the memory 106 as shown in FIG. 11, namely the pattern-flag write starting address, the first-color write starting address, and the second, third, and fourth-color write starting address, are specified to the DMACs 221 and 231. If a block of interest is identified as the same as the previous block by referring to the pattern flag, the output of the previous block is used as is as the output of the block of interest, and if the pattern flag is other than that, decompression will be performed in the same manner as described above. This time, a single block of data needs to be buffered because it may be used for the next block.

However, in the case of reducing the image size to half through decompression processing, data that matches an adjacent block cannot be decompressed by reading only the first color data from the memory 106 and forming an image as described above. Thus, in the decompression processing according to the fourth embodiment, the pattern flag is referred to restore a half size image based on the first color data. In this case, it is not necessary to use the second, third, and fourth color data. More specifically, if a block of interest is identified as the same as the previous block by referring to the pattern flag, the previous color data in the first color data is repeatedly output, which enables decompression. This enables a savings in bandwidth of the memory bus.

According to the fourth embodiment, focusing on similarity between adjacent blocks enables a reduction of redundancy between blocks and improving the compression rate, which can achieve similar effects to those observed in the case of implementing the color processing as described in the above embodiments that can be completed by one pixel input and one pixel output.

Fifth Embodiment

Next is a detailed description of a fifth embodiment according to the present invention with reference to the drawings. The fifth embodiment enhances random accessibility in the compression processing of raster image data in the aforementioned embodiments. Note that the description of the fifth embodiment also takes the example of an MFP as an image processing apparatus as in the first embodiment.

As described previously, the compression processing is variable-length compression processing that depends on image data and has variable size for compressed data. The compressed data has thus no random accessibility and is not fit for the purpose of extracting and processing part of an image, for example.

Figure 12:
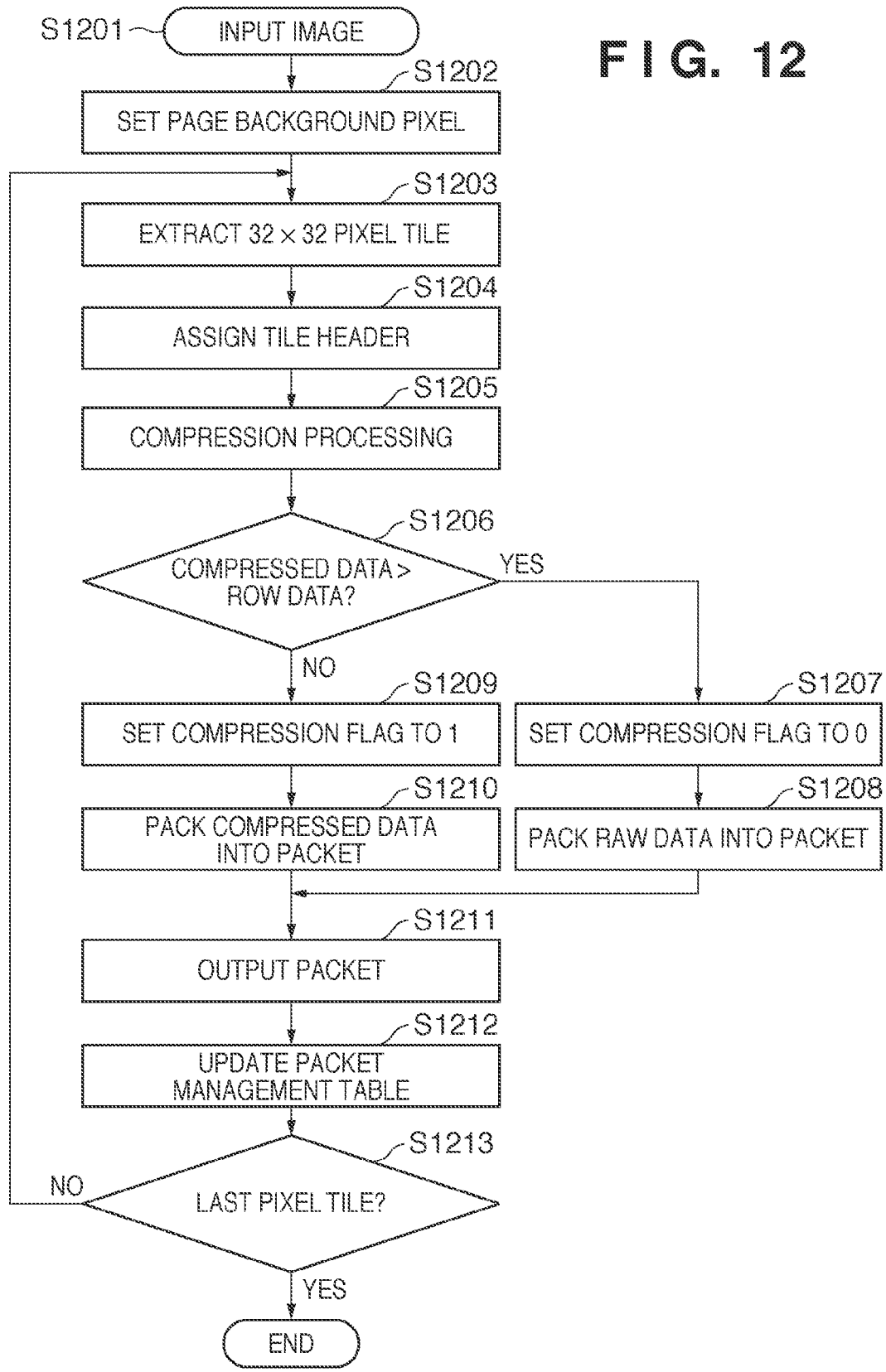
FIG. 12 is a flowchart showing compression processing according to a fifth embodiment.
Figure 13:
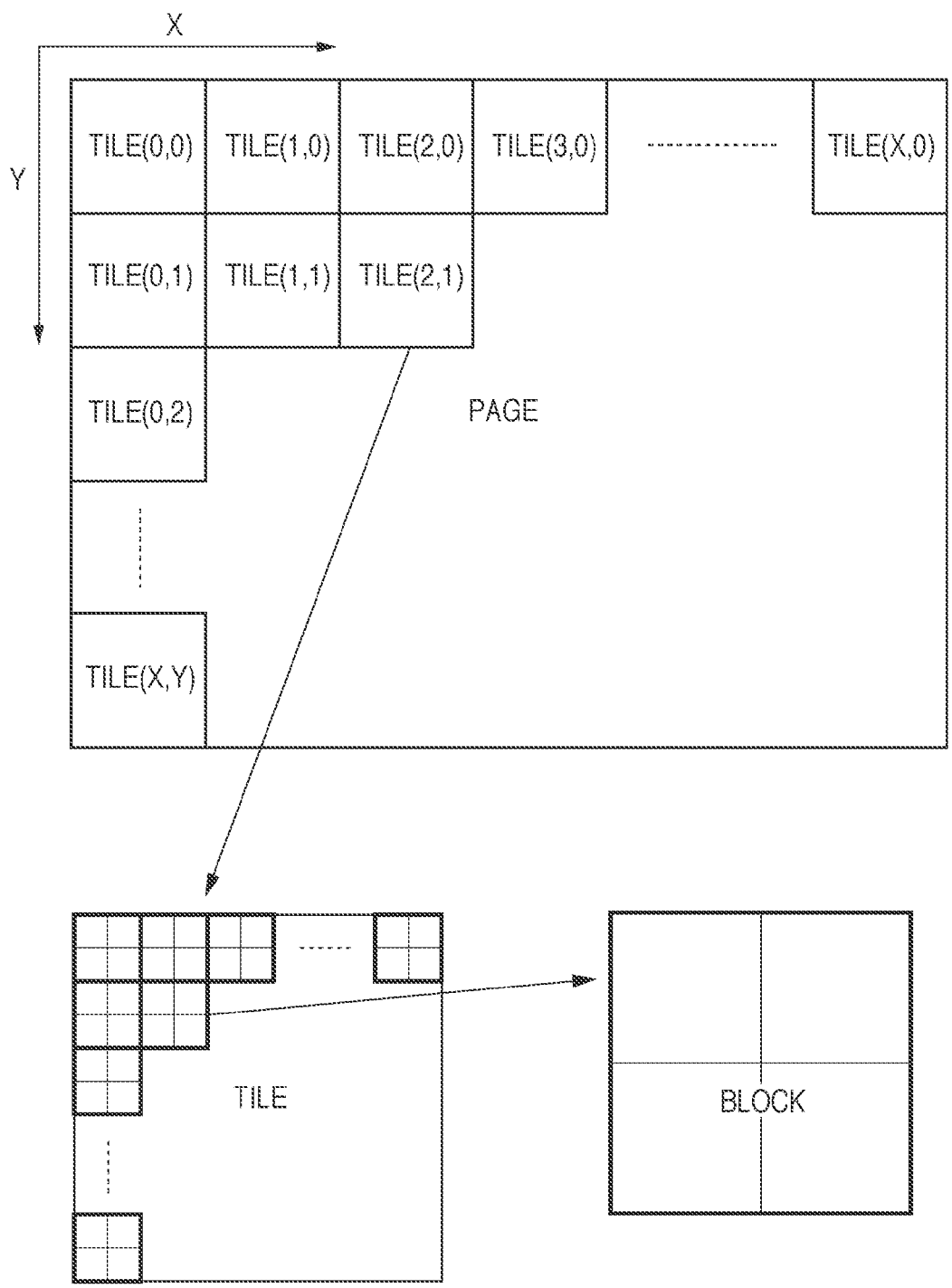
FIG. 13 is a diagram showing the relationship of a page, 32×32 pixel tiles, and 2×2 pixel blocks.

The following is a detailed description of a compression method that focuses on improving random accessibility as compared to the methods described in the foregoing embodiments, with reference to FIG. 12. First, raster image data is input in pages shown in FIG. 13 (S1201). Then, a single page background pixel is set for each page of the image data (S1202). This is pixel data to be used as an initial storage block at the time of compression processing and it is usually white (255 in the case of an image with the RGB colors having 8 bits each, or 0 in the case of a CMYK image). Next, image data as an input of the compression unit is divided into a predetermined size of blocks (S1203). The block size in the fifth embodiment is 32×32 pixels. In the following description, these blocks are referred to as "tiles" so as to be distinguished from the 2×2 pixel blocks described above. A single tile contains 16×16 blocks each being a 2×2 pixel block. FIG. 13 is a diagram illustrating the relationship of a page, 32×32 pixel tiles, and 2×2 pixel blocks.

Next, header information with a predetermined fixed length is assigned to each tile (S1204). This header information includes a page ID, tile coordinates, color space, the number of bits in pixel data, the data size of the tile, the presence or absence of attribute information, and a compression flag, for example. Here, the page ID is a unique ID number assigned to each page. The tile coordinates are coordinate information indicating the location of the tile in the raster image in pages. Here, the coordinates are described in two dimensions, namely X and Y coordinates. The color space is information indicating an identifier for identifying whether the tile is an RGB image, a CMYK image, or a gray-scale image. The number of bits in pixel data is information indicating the bit length per pixel in the tile. The data size is information in bytes, indicating the size of the first color data and the size of the second, third, and fourth color data in the tile. The presence or absence of attribute information is information indicating whether or not attribute information such as character or photograph is assigned to each pixel in image data. The compression flag is flag information indicating whether the tile is compressed or uncompressed data. Note that this compression flag will be described later in more detail.

Next, compression processing is applied to the above-described tiles (S1205). This compression processing is similar to that described in the above embodiments and thus has not been described here. Note that an initial storage block is defined as a storage block at the time of compressing the first 2×2 pixel block, for which a block filled with background pixels is used. This may eliminate the need to output pixel data of the first 2×2 pixel block in each tile and accordingly can reduce the amount of data for those blocks. This is most likely to occur with white in the case of a normal original image, which is the reason why background pixels are set to white.

Then, the data size of the tile data that has gone through the compression processing is calculated. This is the sum of the pattern-flag size, the first-color data size, and the second, third, and fourth-color data size. Since the pattern flag is always added, there is no guarantee that the data size will be reduced from the data size of original image data. Thus, if the data size of tile data after compression exceeds that of original tile data, it is better to output original image data in terms of overall memory efficiency. Accordingly, the compressed data size and the original data size are compared (S1206) and if the compressed data size exceeds the original data size, the compression flag of the header is set to 0 (S1207), and if not, the flag is set to 1 (S1209).

Figures 14, 15:
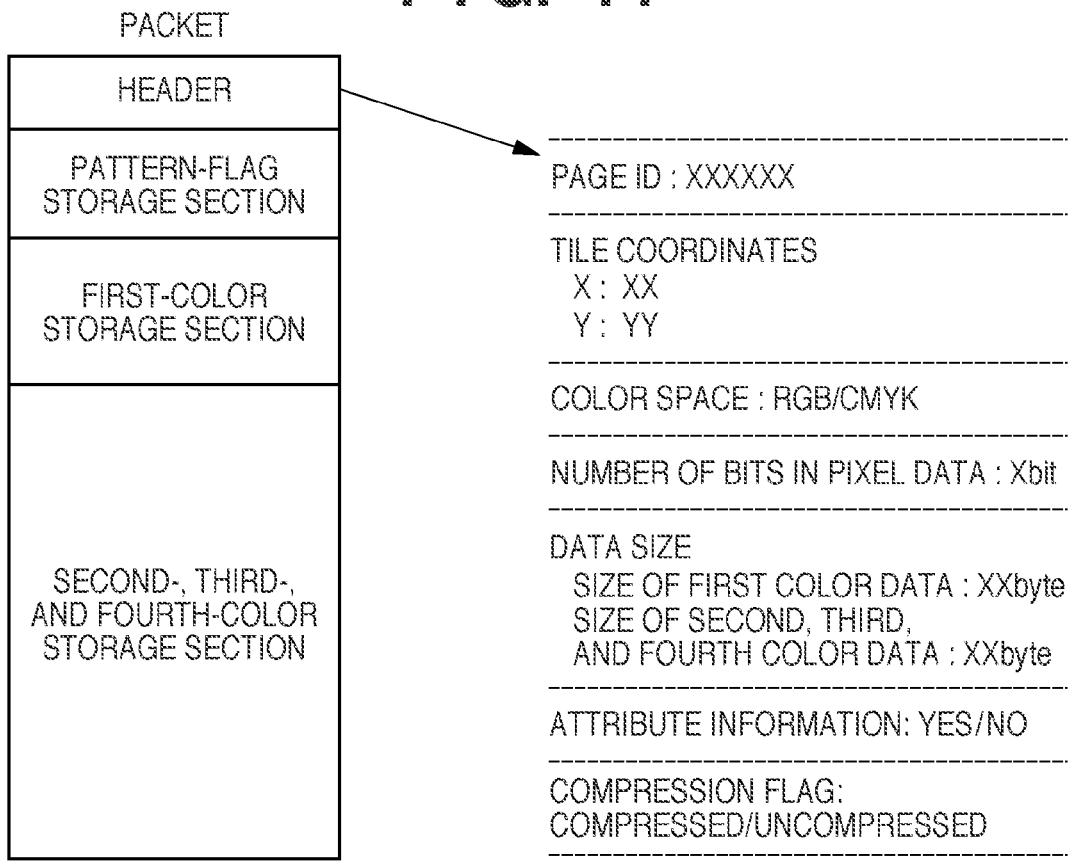
FIG. 14 is a diagram illustrating a data structure of packed data.
FIG. 15 is a diagram showing an example of the structure of a packet management table.

Then, in view of the above-described comparison result, either the compressed tile data or the original tile data is packed together with the header information of the tile into single data (S1208, S1210). The data structure of this packed data is shown in FIG. 14. Hereinafter, the unit of the above-described data including the header is referred to as a "packet". Such a packet is generated by packing data with no space left between the first-color storage section and the second, third, and fourth-color storage section after tile-by-tile compression processing has been completed and the data size has been determined. Thereafter, the packet is output to the memory via the DMAC (S1211). Then, the coordinates and size of this packet are listed to generate a packet management table (S1212). An example of such a packet management table is shown in FIG. 15. By repeating the above-described processing until the last tile (YES in S1213), the page-by-page compression processing of the raster image is completed.

Note that if data is written to the memory in tiles as described above, each packet will have different sizes and their starting addresses are located discretely as shown in FIG. 16. Thus, the starting address of a packet at any coordinates is searched using the packet management table as shown in FIG. 15. Accordingly, if the writing address of the first packet is known, the starting address of any packet can be obtained by offsetting the data size up to the coordinates described in the packet management table. For example, in the case of reading the third packet shown in FIG. 16, the sum of the sizes of the first and second packets is obtained from the packet management table and is offset from the address of the first packet in order to calculate the address of the third packet. Then, data is read from there, which enables acquisition of the third packet data.

As described above, any data can be accessed on a tile-by-tile basis, which enables partial processing of an image. For example, in the case where it is desired to extract and process an area in an image, it is sufficient to acquire and process packet data corresponding to that area.

Moreover, since the header is assigned to each packet, decompression processing is performed using information described in the header. First, if the compression flag indicates uncompressed data, data excluding the header is output, and if not, decompression processing is performed. In the decompression processing, the pattern-flag storage location, the first-color-data storage location, and the second, third, and fourth-color-data storage location are obtained from the header, and thereafter, data is decompressed sequentially into tile image data in the same manner as described in the above embodiments.

For example, the location of the pattern flag can be obtained by offsetting since the header has a fixed length. As to the first color data, it can be obtained by being offset from the location of the pattern flag since the size of the pattern flag is fixed at 32×32 bits when the tile size is 32×32 pixels. Lastly, the second, third, and fourth color data can be obtained by being offset from the location of the first color data by referring to the data size of the first color data described in the header since the first color data has an indeterminate length.

According to the fifth embodiment, even in variable-length compression processing that depends on image data and has a varying data size for compressed data, it is possible to improve random accessibility to compressed data and to extract and process part of an image on a tile-by-tile basis.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a non-transitory recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-221444, filed Sep. 25, 2009, which is hereby incorporated by reference herein in its entirety.

The invention claimed is:

1. An image processing apparatus for dividing image data into blocks having a predetermined number of pixels and processing each of the divided blocks in sequence, the apparatus comprising:
    identification means for identifying, for each of the divided blocks, a pattern flag that corresponds to a placement pattern of color data included in each of the divided blocks by comparing the color data among pixels included in each of the divided blocks, wherein the pixels are included in one block of the divided blocks;
    output means for outputting the pattern flag identified for each of the divided blocks by the identification means and the color data included in each of the divided blocks, wherein the color data outputted for each of the divided blocks includes at least first color data corresponding to a pixel at a predefined position in each of the divided blocks, and wherein the color data outputted for each of the divided blocks further includes the other color data different from the first color data when each of the divided blocks includes the other color data; and
    storage means for storing the pattern flag outputted for each of the divided blocks by the output means into a first memory area, and storing the first color data outputted for each of the divided blocks by the output means into a second memory area, and storing the other color data outputted for each of the divided blocks by the output means into a third memory area.

2. The apparatus according to claim 1, further comprising:
    color-reduction processing means for performing color-reduction processing on each of the divided blocks,
    wherein, after the color-reduction processing means performs the color-reduction processing, the identification means identifies the pattern flag that corresponds to the placement pattern of the color data for each of the divided blocks for which the color-reduction processing has been performed.

3. The apparatus according to claim 2, further comprising setting means for providing a user interface for setting a threshold value used by the color-reduction processing means in determining whether or not to regard color data as the same color and perform color-reduction processing.

4. The apparatus according to claim 1, further comprising storage means for staring color data of a previous block processed previously,
    wherein, when a difference between the color data of the block to be processed and the color data of the previous block stored in the storage means is small, the output means outputs a pattern flag indicating repetition of the previous block and does not output the color data of the block to be processed.

5. The apparatus according to claim 1, wherein, when attribute data indicating an attribute is assigned to each pixel in the blocks, the output means additionally outputs the attribute data.

6. The apparatus according to claim 1, wherein a page image is divided into tiles that contain a larger number of pixels than the blocks, the divided tiles are regarded as the image data and each is divided into blocks having a predetermined number of pixels, and each of the divided blocks is processed in sequence.

7. The apparatus according to claim 1, wherein the blocks are 2×2 pixel blocks.

8. The apparatus according to claim 7, wherein the first color data of each of the divided blocks is color data corresponding to a pixel at the predefined position in each of the 2×2 pixel blocks.

9. The apparatus according to claim 1, wherein the color data is a pixel value.

10. An image processing apparatus for dividing image data into 2×2 pixel blocks and processing each of the divided blocks in sequence, the apparatus comprising:
    identification means for identifying, for each of the divided blocks, a pattern flag that indicates a placement pattern of color data and the number of colors included in each of the divided blocks by comparing the color data among pixels included in each of the divided blocks, wherein the pixels are included in one block of the divided blocks;
    extraction means for extracting, as first color data, color data that corresponds to a pixel at a predefined position in each of the 2×2 pixel blocks and, when the number of colors indicated by the identified pattern flag is determined as any of two to four, further extracting second to fourth color data based on the placement pattern defined by the identified pattern flag; and
    storage means for storing the pattern flag of each block identified by the identification means into a first memory area, and storing the first color data of each block extracted by the extraction means into a second memory area, and storing the second to fourth color data of each block extracted by the extraction means into a third memory area.

11. A processing method for an image processing apparatus for dividing image data into blocks having a predetermined number of pixels and processing each of the divided blocks in sequence, comprising:

an identification step of identifying, for each of the divided blocks, a pattern flag that corresponds to a placement pattern of color data included in each of the divided blocks by comparing the color data among pixels included in each of the divided blocks, wherein the pixels are included in one block of the divided blocks;

an output step of outputting the pattern flag identified for each of the divided blocks in the identification step and color data included in each of the divided blocks, wherein the color data outputted for each of the divided blocks includes at least first color data corresponding to a pixel at a predefined position in each of the divided blocks, and wherein the color data outputted for each of the divided blocks further includes the other color data different from the first color data when each of the divided blocks includes the other color data; and a storage step of storing the pattern flag outputted for each of the divided blocks into a first memory area, and storing the first color data outputted for each of the divided blocks into a second memory area, and storing the other color data output for each of the divided blocks into a third memory area.

12. A processing method for an image processing apparatus for dividing image data into 2×2 pixel blocks and processing each of the divided blocks in sequence, comprising:

an identification step of identifying, for each of the divided blocks, a pattern flag that indicates a placement pattern of the color data and the number of colors included in each of the divided blocks by comparing the color data among pixels included in each of the divided blocks, wherein the pixels are included in one block of the divided blocks;

an extraction step of extracting, as first color data, color data of a pixel at a predefined position in each of the 2×2 pixel blocks and, when the number of colors indicated by the identified pattern flag is determined as any of two to four, further extracting second to fourth color data based on the placement pattern defined by the identified pattern flag; and a storage step of storing the pattern flag of each block identified in the identification step into a first memory area, and storing the first color data of each block extracted in the extraction step into a second memory area, and storing the second to fourth color data of each block extracted in the extraction step into a third memory area.

13. A non-transitory computer-readable recording medium for storing a program which causes a computer to perform the processing method described in claim 11.

14. A non-transitory computer-readable recording medium for storing a program which causes a computer to perform the processing method described in claim 12.

* * * * *